(12) United States Patent
He

(10) Patent No.: US 10,359,582 B2
(45) Date of Patent: Jul. 23, 2019

(54) FIBER OPTIC CONNECTOR

(71) Applicant: HYC Co., Ltd., Qingyuan (CN)

(72) Inventor: Yong He, Qingyuan (CN)

(73) Assignee: HYC CO., LTD., Qinggyuan (CN)

( * ) Notice: Subject to any disclaimer, the term of this patent is extended or adjusted under 35 U.S.C. 154(b) by 0 days.

(21) Appl. No.: 15/855,553

(22) Filed: Dec. 27, 2017

(65) Prior Publication Data

US 2019/0011647 A1    Jan. 10, 2019

(30) Foreign Application Priority Data

Jul. 10, 2017 (CN) .......................... 2017 1 0557181

(51) Int. Cl.
*G02B 6/38* (2006.01)
(52) U.S. Cl.
CPC ......... *G02B 6/3893* (2013.01); *G02B 6/3825* (2013.01); *G02B 6/3846* (2013.01)
(58) Field of Classification Search
CPC ... G02B 6/3825; G02B 6/3846; G02B 6/3893
See application file for complete search history.

(56) References Cited

U.S. PATENT DOCUMENTS

| | | | | |
|---|---|---|---|---|
| 7,651,361 B2 * | 1/2010 | Henry | ................. | H01R 13/6272 439/352 |
| 8,348,686 B1 * | 1/2013 | Huang | ................ | H01R 13/6392 439/133 |
| 8,556,645 B2 * | 10/2013 | Crain | ................... | H01R 13/633 438/258 |
| 9,151,907 B2 * | 10/2015 | Jiang | .................... | G02B 6/3898 |
| 9,599,778 B2 * | 3/2017 | Wong | ................... | G02B 6/3825 |
| 9,761,998 B2 * | 9/2017 | De Dios Martin | ........................ | H01R 13/6272 |
| 10,120,138 B2 * | 11/2018 | Jones | ................... | G02B 6/3825 |
| 2003/0063862 A1 * | 4/2003 | Fillion | ................ | G02B 6/3825 385/53 |
| 2011/0177710 A1 * | 7/2011 | Tobey | ................. | H01R 13/514 439/345 |
| 2013/0216188 A1 * | 8/2013 | Lin | ....................... | G02B 6/3893 385/77 |
| 2013/0301994 A1 * | 11/2013 | Motofuji | .................. | G02B 6/36 385/78 |
| 2018/0217339 A1 * | 8/2018 | Ma | ...................... | G02B 6/3893 |

* cited by examiner

*Primary Examiner* — Daniel Petkovsek
(74) *Attorney, Agent, or Firm* — Hunton AK LLP

(57) ABSTRACT

Provided is a fiber optic connector. The fiber optic connector includes: a connector body, a locking mechanism, a frame, a motion conversion assembly and a handle. The motion conversion assembly is capable of converting a translation of the handle into a rotation. The connector is unlocked from an adaptor by pulling the handle. This avoids a case where a locking protrusion is disengaged from a locking slot only when a driving arm is pressed from above the connector, and minimizes an operating space required by pressing the driving arm when the connector is inserted or removed, so that the adaptors and/or the connectors can be mounted at a higher density. Moreover, the handle is connected to the driving arm via the motion conversion assembly.

10 Claims, 5 Drawing Sheets

--Prior Art--

ND STATES PATENT

FIBER OPTIC CONNECTOR

CROSS-REFERENCES TO RELATED APPLICATIONS

This application claims priority to Chinese patent application No. CN201710557181.1, filed on Jul. 10, 2017, the disclosure of which is incorporated herein by reference in its entirety.

TECHNICAL FIELD

The present disclosure relates to the field of physical connection technology for optical communication and, in particular, to a fiber optic connector.

BACKGROUND

A fiber optic connector, a device used for detachably (movably) connecting optical fibers, precisely connects two end faces of the optical fibers so that light energy outputted by a transmitting optical fiber is maximally coupled to a receiving optical fiber.

FIG. 1 illustrates a fiber optic connector in the related art. The fiber optic connector includes a connector body 1' and a tail casing 8' that is fixed to an end of the connector body 1' to protect an optical cable 9'. The optical cable 9' is inserted into the connector body 1' through the tail casing 8' and then connected to an end of a fiber stub 10'. The other end of the fiber stub 10' is exposed from the other end of the connector body 1'. The fiber optic connector further includes a locking mechanism 2'. The locking mechanism 2' includes a flexible tilt arm 21' obliquely extending from outside the connector body 1', locking protrusions 22' protruding from two sides of the tilt arm 21' and a driving arm 23' connected to the tilt arm 21'. When the fiber optic connector is inserted into an adaptor, the locking protrusions 22' are engaged in a locking slot of the adaptor and a tail end of the driving arm 23' is exposed outside the adaptor. In this way, the locking slot locks the locking protrusions 22' so that the entire fiber optic connector cannot be pulled out directly from the adaptor. When the adaptor and the fiber optic connector needs to be separated from each other, an operator presses the tail end of the driving arm 23' to drive a tail end of the tilt arm 21' to move towards outside the connector body 1' so as to drive the locking protrusions 22' to be disengaged from the locking slot, so that the fiber optic connector can be pulled out from the adaptor.

A disadvantage of the above fiber optic connector is that sufficient operation space must be reserved on a mounting panel for mounting the adaptor so as to ensure the pressing operation of the driving arm 23'. As a result, the fiber optic connector occupies a large space and adaptors on the mounting panel cannot be arranged in a high-density stack arrangement, thereby affecting a mounting density of the mounting panel.

Although the related art provides a fiber optic connector where a connector body is unlocked from an adaptor pulling a handle. However, the handle directly pulls the tail end of the driving arm to move, driving the tail end of the tilt arm to approach the outside of the connector body, so as to drive the locking protrusions to be disengaged from the locking slot. The operation needs great effort.

SUMMARY

The present disclosure provides a fiber optic connector.

The fiber optic connector includes: a connector body, a locking mechanism, a frame, a motion conversion assembly and a handle.

A first end of the connector body is configured to be inserted into an adaptor.

The locking mechanism comprises a tilt arm, a locking protrusion and a driving arm. The tilt arm obliquely extends from the connector body, the locking protrusion protrudes outwards from a side of the tilt arm, and a first end of the driving arm is connected to the tilt arm.

A second end of the connector body is connected, by the frame, to a tail casing into which an optical cable is inserted. The motion conversion assembly is pivoted to the frame. A first end of the motion conversion assembly is movably joined to a second end of the driving arm. A second end of the motion conversion assembly is connected to the handle. The motion conversion assembly is capable of converting a translation of the handle into a rotation of the motion conversion assembly to enable the first end of the motion conversion assembly to press the second end of the driving arm, so as to unlock the connector body from the adaptor.

REFERENCE NUMERALS LIST

1'—connector body, 2'—locking mechanism, 8'—tail casing, 9'—optical cable, 10'—fiber stub;
21'—tilt arm, 22'—locking protrusion, 23'—driving arm;
1—connector body, 2—locking mechanism, 3—motion conversion assembly, 4—frame, 5—casing, 6—mounting base, 7—handle, 8—tail casing, 9—optical cable, 10—fiber stub;
21—tilt arm, 22—locking protrusion, 23—driving arm;
31—reversible plate, 32—handle slider;
311—pressed surface, 312—sliding extension portion, 321—first portion of handle slider, 322—second portion of handle slider;

3211—driving block, 3212—accommodation slot, 3213—first sliding protrusion;

41—first sliding slot, 42—movable connecting portion, 43—fixing protrusion;

51—second sliding protrusion;

61—mounting slot, 611—second sliding slot.

DETAILED DESCRIPTION

The solution of the present disclosure is further described in conjunction with the following embodiment and accompanying drawings. It is to be understood that the embodiments set forth below is intended to illustrate and not to limit the present disclosure. For ease of description, only a part, not all, related to the present disclosure is illustrated in the accompanying drawings.

Figure 1:
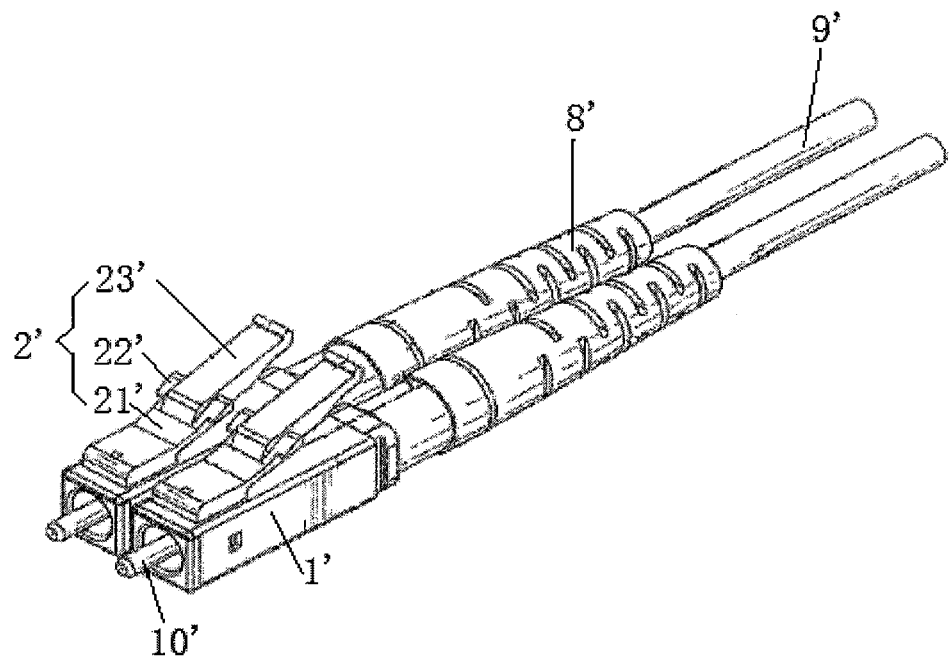
FIG. 1 is a structural diagram of a fiber optic connector in the related art.
Figure 2:
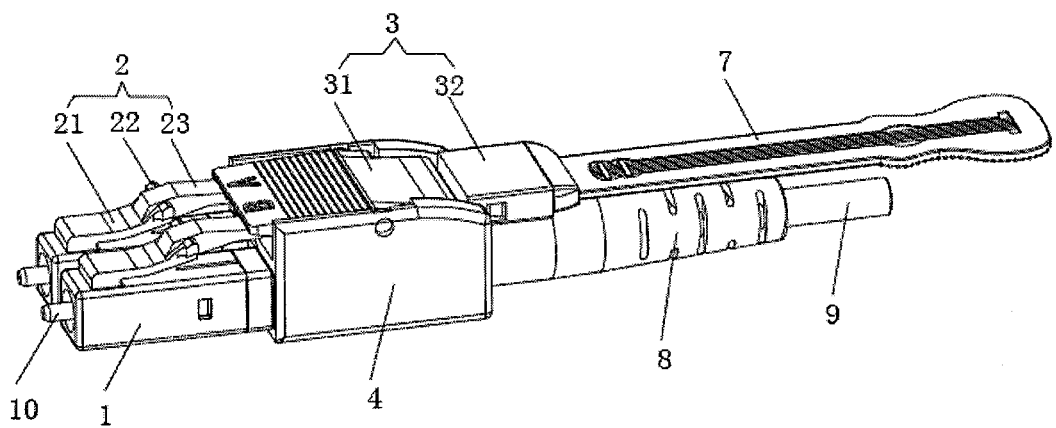
FIG. 2 is a structural diagram of a fiber optic connector according to the present disclosure.
Figure 3:
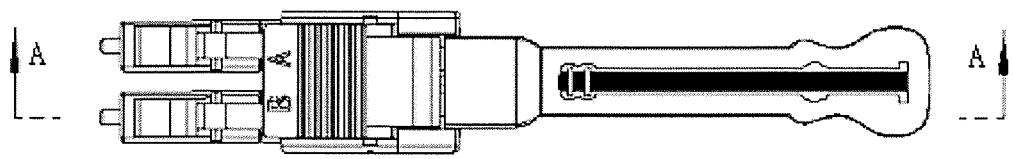
FIG. 3 is a front view of the fiber optic connector according to the present disclosure.
Figure 4:
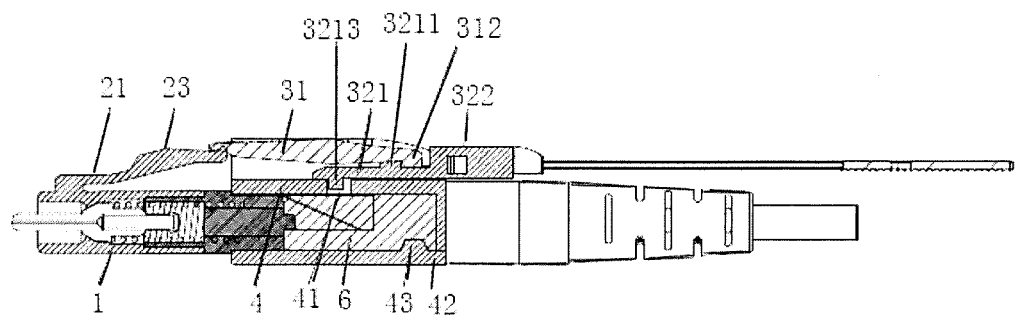
FIG. 4 is a cross sectional view taken along A-A of FIG. 3.
Figure 5:
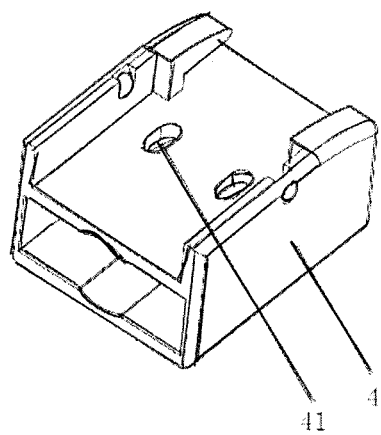
FIG. 5 is a first structural diagram of a frame according to the present disclosure.
Figure 6:
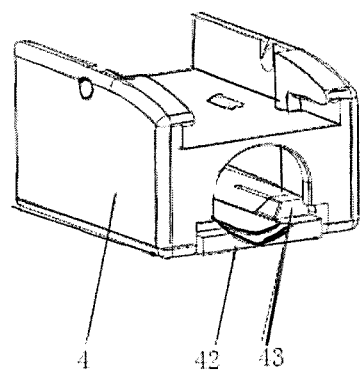
FIG. 6 is a second structural diagram of the frame according to the present disclosure.
Figure 7:
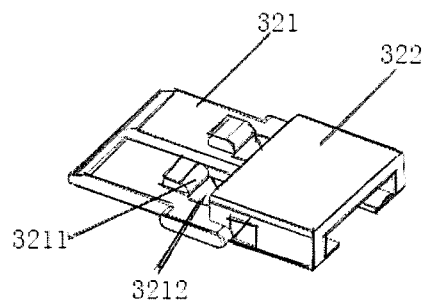
FIG. 7 is a first structural diagram of a handle slider according to the present disclosure.
Figure 8:
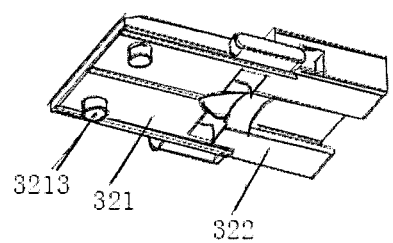
FIG. 8 is a second structural diagram of the handle slider according to the present disclosure.
Figure 9:
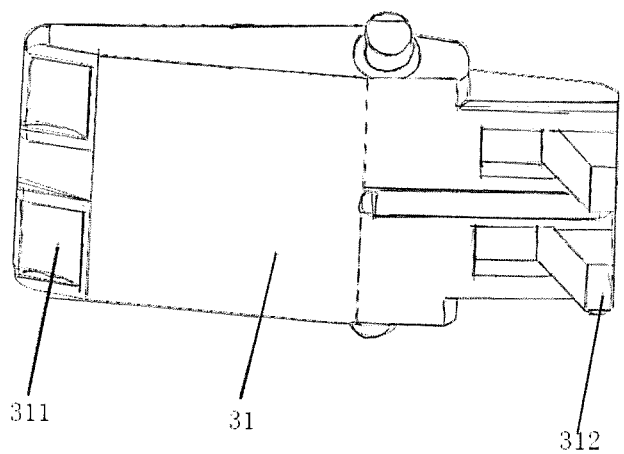
FIG. 9 is a structural diagram of a reversible plate according to the present disclosure.
Figure 10:
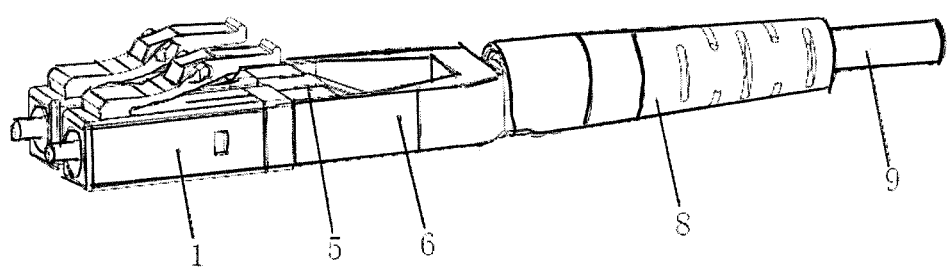
FIG. 10 is a structural diagram of the fiber optic connector without a handle and a motion conversion assembly according to the present disclosure.
Figure 11:
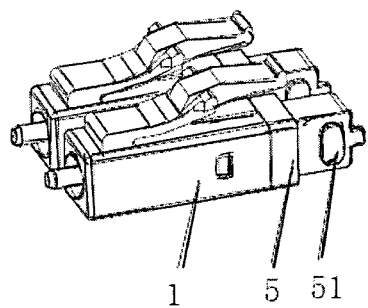
FIG. 11 is a structural diagram of a connector body and a casing according to the present disclosure.
Figure 12:
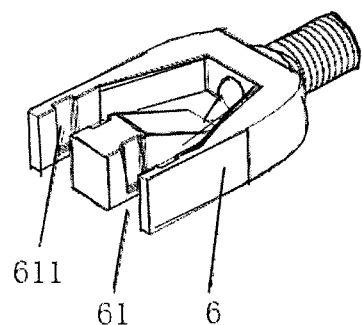
FIG. 12 is a structural diagram of a mounting base according to the present disclosure.

As illustrated in FIGS. 2 to 12, the present disclosure provides a fiber optic connector. The fiber optic connector is configured to be connected to an adaptor so as to connect, distribute or redirect optical fibers that are connected to the connector and the adaptor. The fiber optic connector includes a connector body 1, a locking mechanism 2, a motion conversion assembly 3, a frame 4 and a handle 7. A first end of the connector body 1 is configured to be inserted into the adaptor. A second end of the connector body 1 is connected to a first end of the frame 4. A second end of the frame 4 is connected to a tail casing 8 into which an optical cable 9 is inserted. The locking mechanism 2 includes a tilt arm 21, a locking protrusion 22 and a driving arm 23. The tilt arm 21 obliquely extends from the connector body 1. The locking protrusion 22 protrudes outwards from a side of the tilt arm 21 and is configured to lock the connector body 1 to a locking slot of the adaptor. A first end of the driving arm 23 is connected to the tilt arm 21. A second end of the driving arm 23 is connected to a first end of the motion conversion assembly 3. A second end of the motion conversion assembly 3 is connected to the handle 7. The motion conversion assembly 3 is configured to convert a translation of the handle 7 into a rotation of the motion conversion assembly 3.

When pulled, the handle 7 drives the motion conversion assembly 3 to rotate and thus the second end of the driving arm 23 is pressed. Meanwhile, the tilt arm 21 connected to the first end of the driving arm 23 is driven to move towards a horizontal direction. When an included angle between the tilt arm 21 and the horizontal direction is less than a certain degree, the locking protrusion 22 is disengaged from the locking slot of the adaptor, thereby unlocking the connector body 1 from the adaptor.

The fiber optic connector provided by the present disclosure can be unlocked from the adaptor just by pulling the handle. This avoids a case where the locking protrusion 22 is disengaged from the locking slot only when the driving arm 23 is pressed from above the connector, and minimizes an operating space for pressing the driving arm 23 when the connector is inserted or removed, so that multiple adaptors and/or connectors can be stacked in a closer arrangement, i.e., the adaptors and/or the connectors can be mounted at a higher density. Moreover, the handle 7 is connected to the driving arm 23 via the motion conversion assembly 3 capable of converting the translation of the handle 7 into the rotation of the motion conversion assembly 3. In operation, just slightly pulled, the handle 7 drives the motion conversion assembly 3 to rotate, so that an end of the motion conversion assembly 3 engaged with the driving arm 23 presses the driving arm 23 to enable the locking protrusion 22 to be disengaged from the locking slot. Such operation is convenient and effortless.

Referring to FIGS. 2 to 9, the motion conversion assembly 3 includes a reversible plate 31 and a handle slider 32. A middle of the reversible plate 31 is pivoted to the frame 4. The reversible plate 31 is rotatable around a pivot axis of the reversible plate 31. A first end of the reversible plate 31 cooperates with the second end of the driving arm 23. A second end of the reversible plate 31 cooperates with a first portion 321 of the handle slider. A second portion 322 of the handle slider is detachably connected to the handle 7. The handle slider 32 is slidably arranged on the frame 4. When pulled, the handle 7 drives the handle slider 32 to slide so as to drive the reversible plate 31 to rotate.

Specifically, a lower end face of the first portion 321 of the handle slider is provided with a first sliding protrusion 3213 protruding downwards, accordingly the frame 4 is provided with a first sliding slot 41 extending in a moving direction of the handle 7. The first sliding protrusion 3213 can slide in the first sliding slot 41. An upper end face of the first portion 321 of the handle slider is provided with a driving block 3211 protruding upwards, accordingly the second end of the reversible plate 31 is provided with a sliding extension portion 312 extending downwards. A surface of the sliding extension portion 312 cooperating with the driving block 3211 is a sloping surface. When the handle 7 is pulled, the handle 7 drives the handle slider 32 to move along the first sliding slot 41 in a direction away from the connector body 1 and, meanwhile, the driving block 3211 at the upper end face of the handle slider 32 slides with respect to the sloping surface of the sliding extension portion 312 of the reversible plate 31, so as to drive the reversible plate 31 to rotate and make the first end of the reversible plate 31 press the second end of the driving arm 23. Optionally, a surface at the first end of the reversible plate 31 and cooperating with the second end of the driving arm 23 is a pressed surface 311. The pressed surface 311 is arc-shaped. Accordingly, an edge of the second end of the driving arm 23 is bent towards the pressed surface 311 to form a bent portion. The bent portion is configured to movably contact the pressed surface 311.

Sliding resistance between the first sliding protrusion 3213 and the first sliding slot 41 is small, so a small pulling force applied to the handle 7 can drive the handle slider 32 to slide. When the handle slider 32 slides, the driving block 3211 slides along the sloping surface of the sliding extension portion 312 to drive the reversible plate 31 to rotate. Sliding resistance between the driving block 3211 and the sloping surface is small, so the handle slider 32 can easily drive the reversible plate 31 to rotate. The overall movement is smooth and such operation is convenient and effortless.

Further, to ensure smoothness between the driving block 3211 and the sloping surface of the sliding extension portion 312, a portion of the driving block 3211 which is in contact with the sloping surface is configured to be arc-shaped. Additionally, to ensure a sliding route of the sloping surface of the sliding extension portion 312 and prevent the driving block 3211 from protruding over-high from the handle slider 32, an accommodation slot 3212 is provided on the upper end face of the first portion 321 of the handle slider and between the driving block 3211 and the second portion 322 of handle slider. A lower end of the sliding extension portion 312 is able to extend into the accommodation slot 3212. Moreover, a limiting protrusion protrudes from a side of the handle slider 32. The limiting protrusion can prevent the handle slider 32 from being reversed in the frame 4.

Furthermore, the handle 7 may be a soft handle or a hard handle. When the handle 7 is a soft handle, the handle 7 can only pull the motion conversion assembly 3 to rotate in a direction of pressing the driving arm 23. When the handle 7 is a hard handle, the handle 7 can not only pull the motion conversion assembly 3 to rotate in the direction of pressing the driving arm 23, but can also push the motion conversion assembly 3 to rotate in a direction opposite to the direction of pressing the driving arm 23.

Furthermore, referring to FIG. 6 and FIGS. 10 to 12, a mounting base 6 is provided inside the frame 4 and is configured to join the connector body 1 and the tail casing 8. A screw thread connecting portion is provided at an end of the mounting base 6 used for joining the tail casing 8. The screw thread connecting portion can increase friction for joining the tail casing 8 and thus prevent Kevlar fibers in the optical cable 9 from being exposed. The frame 4 is configured to detachably enclose the mounting base 6. Optionally, a part of a bottom of the frame 4 is an elastic movable connecting portion 42. A fixing protrusion 43 is provided on a side of the movable connecting portion 42 facing the mounting base 6. A fixing slot corresponding to the fixing protrusion 43 is provided on the mounting base 6. When the frame 4 needs to be separated from the mounting base 6, the frame 4 can be removed just by pushing the movable connecting portion 42 to make the fixing protrusion 43 disengaged from the fixing slot.

In the present example, the number of the connector bodies is two. To ensure that the two connector bodies 1 are arranged side by side and separate, two mounting slots 61 are provided at a first end of the mounting base 6 and each of the connector bodies 1 is detachably mounted in a corresponding mounting slot 61 via a casing 5. Specifically, a first portion of the casing 5 is connected to a second end of the corresponding connector body 1, and a second portion of the casing 5 is detachably connected to the corresponding mounting slot 61. Optionally, each of two opposite sides of the mounting slot 61 is provided with a through second sliding slot 611, a second sliding protrusion 51 corresponding to the second sliding slot 611 protrudes from a side of the casing 5. When an external force is applied, the second sliding protrusions 51 slides along the second sliding slot 61 to make the casing 5 inserted into or removed from the mounting base 6.

A through hole communicated with the tail casing 8 is provided at a second end of the mounting base 6. The optical cable 9 passes through the tail casing 8 and then passes through the through hole. Then a protective jacket of the optical cable 9 is peeled off to expose optical fibers. The optical fiber passes through the casing 5 and the mounting slot 61 of the mounting base 6, and then enters the interior of the connector body 1. An optical fiber fixing apparatus is provided inside the connector body 1. The optical fibers are fixed by the optical fiber fixing apparatus and then are connected to a fiber stub 10.

When positions of the two connector bodies 1 need to be exchanged, first, the first end of the reversible plate 31 is disengaged from the second end of the driving arm 23, and then the movable connecting portion 42 of the frame 4 is pushed, so that the fixing protrusion 43 is disengaged from the fixing slot, and the frame 4 is removed together with the motion conversion assembly 3. Then, the two casings 5 connected to the connector bodies 1 are respectively slid out of the mounting slots 61. The positions of the two connector bodies 1 are exchanged, and then the two casings 5 connected to the connector bodies 1 whose positions have been exchanged are slid into the respective mounting slots 61; and last, the frame 4 and the motion conversion assembly 3 are together arranged to enclose the mounting base 6.

The fiber optic connector provided by the present disclosure has multiple advantages including occupying a small operation space and saving efforts when the connector is unlocked from the adaptor and being convenient when exchanging the positions of the two connector bodies 1.

The fiber optic connector provided by the present disclosure can be unlocked from the adaptor when the handle is pulled. This avoids a case where the locking protrusion is disengaged from a locking slot only when the driving arm is pressed from above the connector, and minimizes an operating space in which the driving arm is pressed when the connector is inserted or removed, so that multiple adaptors and/or connectors can be stacked in a closer arrangement, i.e., the adaptors and/or the connectors can be mounted at a higher density. Moreover, the handle is connected to the driving arm via the motion conversion assembly capable of converting translation of the handle into rotation of the motion conversion assembly. In operation, just slightly pulled, the handle drives the motion conversion assembly to rotate, so that an end of the motion conversion assembly joined to the driving arm presses the driving arm to enable the locking protrusion to be disengaged from the locking slot. Such operation is convenient and effortless.

Apparently, the above embodiments of the present disclosure are merely illustrative of the present disclosure and are not intended to limit the present disclosure. To those of ordinary skill in the art, alterations or modifications in other different forms can be made based on the above description. Implementations of the present disclosure cannot be and do not need to be exhausted herein. Any modifications, equivalent replacements and improvements within the spirit and principle of the present disclosure are within the scope of the present disclosure.

What is claimed is:

1. A fiber optic connector, comprising:
   a connector body, wherein a first end of the connector body is configured to be inserted into an adaptor;
   a locking mechanism, comprising a tilt arm, a locking protrusion and a driving arm, wherein the tilt arm obliquely extends from the connector body, the locking protrusion protrudes outwards from a side of the tilt arm, and a first end of the driving arm is connected to the tilt arm;
   a frame, wherein a second end of the connector body is connected, by the frame, to a tail casing into which an optical cable is inserted; and
   a motion conversion assembly and a handle, wherein the motion conversion assembly is pivoted to the frame, a first end of the motion conversion assembly is movably joined to a second end of the driving arm, a second end of the motion conversion assembly is connected to the handle, and the motion conversion assembly is capable of converting a translation of the handle into a rotation of the motion conversion assembly to enable the first end of the motion conversion assembly to press the second end of the driving arm, so as to unlock the connector body from the adaptor,
   wherein the motion conversion assembly comprises a reversible plate pivoted to the frame and a handle slider, the reversible plate has a protrusion, and the frame has a hole receiving the protrusion,
   wherein a first end of the reversible plate cooperates with the second end of the driving arm, a second end of the reversible plate cooperates with a first portion of the handle slider, the protrusion is between the first end and the second end, a second portion of the handle slider is connected to the handle, and the handle slider is slidably arranged on the frame; and when the handle is pulled, the handle drives the handle slider to slide so as to drive the reversible plate to rotate, wherein a lower end face of the first portion of the handle slider is provided with a first sliding protrusion protruding downwards, a first sliding slot extending in a moving direction of the handle is provided on the frame, and the first sliding protrusion is slidable along the first sliding slot; and an upper end face of the first portion of the handle slider is provided with a driving block protruding upwards, the second end of the reversible plate is provided with a sliding extension portion extending downwards, and a surface of the sliding extension portion cooperating with the driving block is a sloping surface, wherein a portion of the driving block cooperating with the sloping surface is configured to be arc-shaped, wherein an accommodation slot is provided on the upper end face of the first portion of the handle slider, between the driving block and the second portion of the handle slider, and a lower end face of the sliding extension portion extends into the accommodation slot.

2. The fiber optic connector of claim 1, wherein a mounting base is provided inside the frame and is configured to join the connector body with the tail casing, and the frame is configured to detachably enclose the mounting base.

3. The fiber optic connector of claim 2, wherein a bottom of the frame is provided with an elastic movable connecting portion, a fixing protrusion is provided on a side of the movable connecting portion facing the mounting base, and a fixing slot corresponding to the fixing protrusion is provided on the mounting base.

4. The fiber optic connector of claim 2, wherein the fiber optic connector comprises two connector bodies.

5. The fiber optic connector of claim 4, wherein two mounting slots are provided at an end of the mounting base for connecting the two connector bodies, and each of the two connector bodies is detachably mounted in a respective one of the two mounting slots via a casing.

6. The fiber optic connector of claim 5, wherein two opposite side walls of each of the two mounting slots is provided with a second sliding slot, the casing is provided with a second sliding protrusion matching with the second sliding slot, and when an external force is applied, the second sliding protrusion is slidable along the second sliding slot.

7. A fiber optic connector, comprising:
a connector body, wherein a first end of the connector body is configured to be inserted into an adaptor;
a locking mechanism, comprising a tilt arm, a locking protrusion and a driving arm, wherein the tilt arm obliquely extends from the connector body, the locking protrusion protrudes outwards from the tilt arm, and a first end of the driving arm is connected to the tilt arm;
a mounting base;
a tail casing, wherein the tail casing is connected to the connector body by the mounting base;
a frame, which is configured to detachably enclose the mounting base;
a handle slider;
a reversible plate; and
a handle,
wherein a front end of the reversible plate is in contact with a second end of the driving arm, a rear end of the reversible plate is coupled to the handle via the handle slider, and the reversible plate has a protrusion on a lateral surface,
wherein the frame has a hole configured to receive the protrusion,
wherein when the handle is pulled, the reversible plate rotates with respect to the protrusion and the driving arm is pressed by the front end of the reversible plate,
wherein the reversible plate has a sliding extension portion at the rear end, the sliding extension portion has a downslope bottom surface,
wherein the handle slider has a driving block protruding upwards, a portion of the driving block cooperating with the downslope bottom surface is configured to be arc-shaped,
wherein when the handle is pulled, the handle slider slides with respect to the frame, and the driving block of the handle slider pushes the downslope bottom surface of the sliding extension portion,
wherein a bottom surface of the handle slider is provided with a protrusion, and the frame has a sliding slot configured to restrict a movement of the protrusion of the handle slider,
wherein an accommodation slot is provided on the upper end face of the first portion of the handle slider, between the driving block and the second portion of the handle slider, and a lower end face of the sliding extension portion extends into the accommodation slot.

8. The fiber optic connector according to claim 7, wherein an upper portion of the frame is recessed, and the frame further comprises two sidewall, a bottom plate, and a middle plate, wherein the sliding slot is formed on the middle plate.

9. The fiber optic connector according to claim 8, wherein the mounting base is between the bottom plate and the middle plate.

10. The fiber optic connector according to claim 7, wherein the driving block of the handle slider has an arc-shaped top surface configured to be in contact with the bottom surface of the sliding extension portion of the reversible plate.

* * * * *